A. L. BERTHELSEN.
TEAT CUP.
APPLICATION FILED DEC. 18, 1915.
1,220,172.
Patented Mar. 27, 1917.
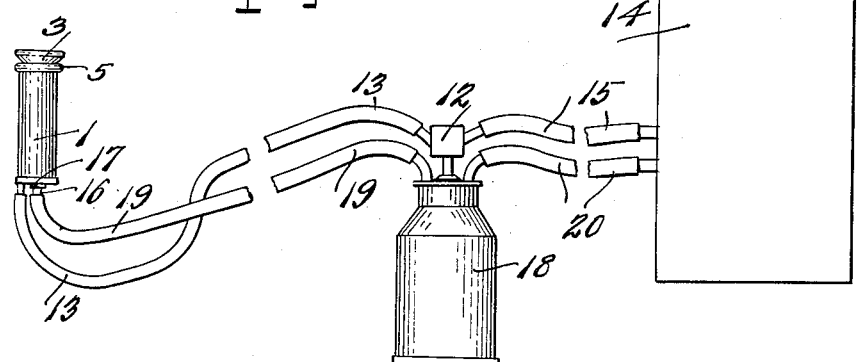
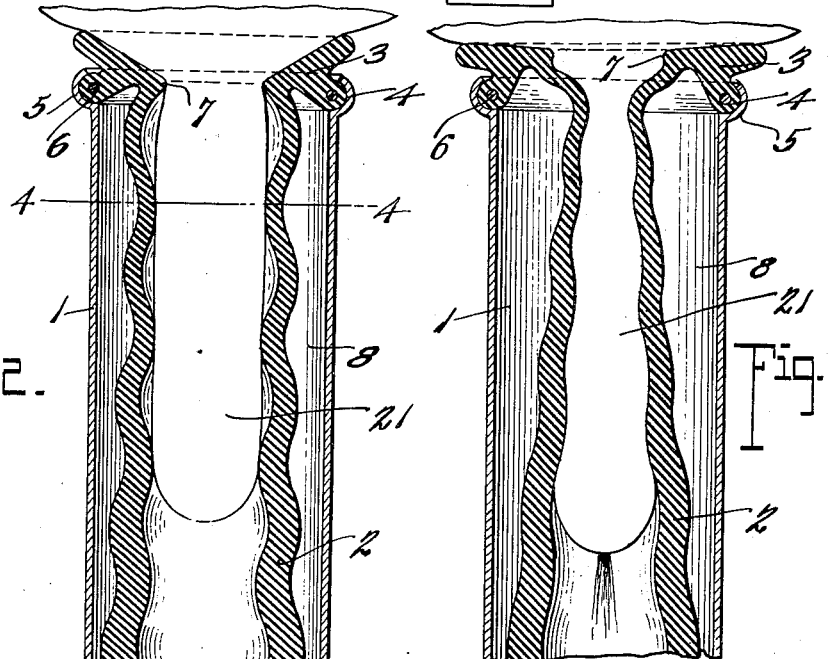
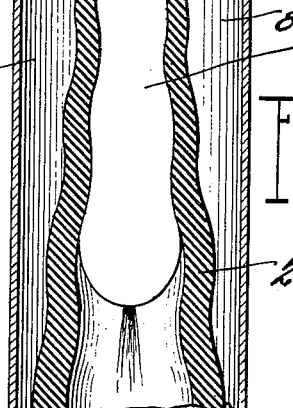
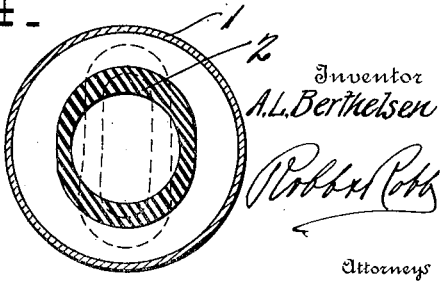

UNITED STATES PATENT OFFICE.

ANDERS L. BERTHELSEN, OF CHICAGO, ILLINOIS.

TEAT-CUP.

1,220,172.  Specification of Letters Patent.  Patented Mar. 27, 1917.

Application filed December 18, 1915. Serial No. 67,640.

*To all whom it may concern:*

Be it known that I, ANDERS L. BERTHELSEN, a citizen of Denmark, residing at Chicago, in the county of Cook and State of Illinois, have invented certain new and useful Improvements in Teat-Cups, of which the following is a specification.

The present invention appertains to improvements in teat cups adapted for use in connection with mechanical milking apparatus. The essence of the invention lies primarily in the construction of the inner teat receiving member or milking tube which is acted upon by pressure means for the purpose of performing the milking operation, this element in my invention being so formed as to produce a relative elongation and shortening of the member simultaneously with the progressive collapsing of the same whereby the stripping of the teat is most effectively accomplished.

A further feature of this device is the provision of special connecting means intermediate the inner collapsible member and its outer casing, such that the mouth of the former is worked in a manner affording a constantly renewing grip, or a relative expansion and contraction of the mouth during the operation of milking.

These and such other objects as may be pointed out hereinafter, are attained by the novel construction, combination and arrangement of parts to be hereinafter specifically described and claimed. Reference will now be had to the accompanying drawing forming a part of this specification, wherein:

Figure 1 is a general view showing the arrangement of the parts of the milking apparatus in which the subject matter of this invention is employed.

Fig. 2 is a longitudinal sectional view of the invention showing the teat receiving member in normal position.

Fig. 3 is a similar view showing the position of the teat receiving member when collapsed.

Fig. 4 is a horizontal sectional view on the line 4—4 of Fig. 2.

Throughout the following detail description and on the several figures of the drawing, similar parts are referred to by like reference characters.

Describing the invention and referring to the drawing, the numeral 1 designates the outer relatively rigid casing comprising one of the main elements of the teat cup and 2 the inner teat receiving member or milking tube. The latter element is made of collapsible material, such for instance as rubber, and two opposite walls of the member 2 are formed relatively thinner at the top and increase in thickness toward the bottom, the walls of the material being also corrugated horizontally throughout the length of the tube. This peculiar formation of the walls of this collapsible member 2 constitutes one of the essential features of novelty of my device inasmuch as it gives rise to a very desirable function in apparatus of this character, as will be later pointed out. The upper extremity of the milking tube 2 is provided with a flaring mouth 3, the outer surface of which is formed with an annular bead 4 projecting outwardly and seated in a groove or flanged portion 5 of the outer casing 1. The bead 4 not only constitutes a connection for the milking tube 2 but said connection is of a peculiar character inasmuch as it is movable in the seat provided by the groove 5, the movement being somewhat pivotal so that the mouth of the milking tube contracts and expands in a manner to be pointed out more particularly as this description proceeds. The bead 4 is of such a character as to constitute in addition to its connecting function a pressure retaining means and to insure positive retention of the bead in its seat, it is preferably reinforced by the insertion of a metallic ring 6 therein. It will be observed by reference to Figs. 2 and 3 that the inner portion of the flaring mouth 3 of the tube 2 is formed with an annular shoulder 7, and this shoulder, as the tube is worked, slides upwardly and downwardly on the udder and thereby maintains an effective grip upon the teat inserted in the milking tube.

The walls of the milking tube 2 are normally spaced from the casing 1 so as to provide a chamber 8, the lower extremity of the tube 2, however, having an annular shoulder 9 contacting with the walls of the lower portion of the casing 1. This shoulder is slightly spaced from the lower extremity of the tube 2 and is provided with a plurality of passages or openings 10 which communicate with an annular chamber 11 at the bottom of the casing 1. With the chamber 8 a pulsator 12 communicates through the conduit 13, said pulsator in turn communicating with the vacuum reservoir 14 through the passage or tube 15, and by means of this pulsator, which may be of any conventional type and for this reason will not be specifically described, atmospheric pressure and vacuum are alternately communicated to the chamber 8.

The lower extremity of the collapsible tube 2 is provided with a connecting member 16 which clamps the tube 2 in the casing 1, as by means of the clamping nut 17 and said member is connected to the milk receiving receptacle 18 by the milk-way 19 and the receptacle 18 in turn communicating with the vacuum reservoir 14 through the tube or passage 20.

Describing the operation of the device, it will be stated that the teat 21 of the cow is inserted within the inner compressible milking tube 2, a constant vacuum being maintained in said tube. As before mentioned, the pulsator 12 is adapted to maintain normally vacuum in the chamber 8 or more strictly speaking provides an alternate vacuum and pressure in this chamber. When atmospheric pressure is admitted thereto the milking tube is collapsed, the collapsing pressure being exerted upon the walls of the tube 2 and being first effective upon the upper portion of the walls owing to their attenuation. The pressure is communicated along the walls downwardly of the tube 2 gradually so as to accomplish the stripping of the teat, the pressure which is exerted as above described causing the corrugations to straighten out. This action provides a relative elongation of the milking tube 2 which renders the stripping action above referred to most effective. As the tube 2 collapses the shoulder 7 of the mouth of the same moves upwardly on the udder to a position such as shown in Fig. 3, the mouth expanding as permitted by the pivotal movement of the mouth portion of the tube. When the pressure is discontinued and vacuum produced in the chamber 8, the walls of the tube 2 assume their normal condition of extension, the corrugations being permitted to reform, thus allowing the teat to be again filled with milk from the udder owing to the constant vacuum which is maintained in the milking tube 2. Upon the expansion of the tube 2 as just described, the shoulder 7 moves downwardly and the mouth of the tube assumes its contracted position.

It will be apparent to those skilled in the art to which this invention refers that the lateral pressure which is exerted on the horizontally corrugated tube 2 causes the relative elongation of this tube due to the straightening out of the corrugations and when the pressure is released there is a corresponding shortening caused by the horizontal corrugations returning to form. The action thus summarized produces an upward and downward motion of the elastic tube and thereby effects a massage of the teat and udder.

Having thus described my invention, what is claimed is:

1. A teat cup comprising an outer casing having smooth walls, and an inner compressible teat receiving tube, the walls of which are formed with corrugations.

2. A teat cup comprising an outer relatively rigid casing formed with smooth walls and an inner teat receiving member formed with corrugated walls spaced from the outer casing, connecting means intermediate the top portion of said inner member and the casing for holding the upper portion of said inner member in spaced relation, and spacing means at the lower portion of said inner member.

3. A teat cup comprising an outer casing and an inner elastic compressible teat receiving member, connecting means intermediate the upper portion of the inner member and the casing permitting relative movement of the mouth of said inner member inwardly and outwardly of the casing, and means clamping the lower end portion of the inner member to the outer casing aforesaid, the walls of the inner member being formed with a series of corrugations to provide a plurality of pressure points for the teat.

4. A teat cup comprising an outer casing and an inner compressible teat receiving member, connecting means intermediate the mouth of the inner member and the casing, a spacing shoulder at the lower portion of the inner member, means for supplying pressure to the outer casing between the wall of the inner member and said casing, said spacing shoulder being provided with passages therethrough, and a tubular connecting member at the lower end of said cup clamping the inner member to the outer casing.

5. The combination with a teat cup comprising an outer casing and an inner elastic teat receiving member having corrugated walls, the material of said walls at opposite sides attenuating toward one end, of pressure means communicating with the casing aforesaid and adapted to act upon said corrugated wall to cause extension thereof for imparting stripping action to the teat when disposed therein.

6. A teat cup comprising an outer casing, a collapsible teat receiving member disposed therein, and a movable connection intermediate the teat receiving member and the casing to permit of expansion and contraction of the mouth of the receiving member as the latter collapses and expands.

7. A teat cup comprising an outer casing, a collapsible and elongatable teat receiving member disposed therein, and a pivot connection intermediate the teat receiving member and the casing to permit of upward and downward movement of the mouth of the receiving member as the latter is relatively elongated and shortened.

8. A teat cup comprising an outer casing, a collapsible teat receiving member disposed therein, and pressure retaining means on the receiving member movably connected to the cup to permit the material of the mouth of the receiving member to shift outwardly and inwardly of the cup opening.

9. A teat cup comprising an outer casing having an annular groove formed therein, a collapsible teat receiving member disposed in said casing, and a bead formed on said receiving member and movably seated in the casing groove aforesaid.

10. A teat cup comprising an outer casing having an annular groove formed therein, a collapsible teat receiving member disposed in said casing, a bead formed on said receiving member and movably seated in the casing groove aforesaid, and a reinforcing member in said bead for holding the bead in the groove against displacement therefrom.

11. As a new article of manufacture, a compressible teat receiving tube consisting of collapsible material, said tube having its walls normally contracted into corrugations.

12. As a new article of manufacture, an elastic teat receiving tube consisting of collapsible material, said tube having its walls formed with annular corrugations adapted to flex upon application of pressure to said walls, the walls at opposite sides of the tube being relatively thinner at one end and increasing in thickness toward the other end.

13. A teat receiving cup comprising an outer casing, a collapsible teat receiving member disposed therein, an inner annular gripping shoulder at the mouth of said receiving member, and a movable connection intermediate the teat receiving member and the casing whereby to permit of inward and outward movements of the mouth of the receiving member to produce a sliding movement of said shoulder.

In testimony whereof I affix my signature.

ANDERS L. BERTHELSEN.